United States Patent
Lim et al.

(10) Patent No.: US 7,848,729 B2
(45) Date of Patent: Dec. 7, 2010

(54) SYSTEM AND METHOD FOR SAVING POWER CONSUMPTION OF SENSOR BASED ON CONTEXT INFORMATION IN WIRELESS SENSOR NETWORK

(75) Inventors: Hun Lim, Seoul (KR); Su-Myeon Kim, Suwon-si (KR); Won-Keun Kong, Suwon-si (KR); Kyle Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 720 days.

(21) Appl. No.: 11/514,875

(22) Filed: Sep. 5, 2006

(65) Prior Publication Data

US 2007/0080288 A1    Apr. 12, 2007

(30) Foreign Application Priority Data

Oct. 11, 2005    (KR) ...................... 10-2005-0095467

(51) Int. Cl.
*H04B 1/16* (2006.01)
(52) U.S. Cl. .................................................. 455/343.2
(58) Field of Classification Search ................ 455/574, 455/343.1, 343.2; 370/311; 250/227.1
See application file for complete search history.

(56) References Cited

U.S. PATENT DOCUMENTS

| 2006/0128349 A1* | 6/2006 | Yoon ........................ 455/343.2 |
| 2006/0172784 A1* | 8/2006 | Ara et al. .................... 455/574 |
| 2006/0209715 A1* | 9/2006 | Kushalnagar et al. ........ 370/254 |
| 2007/0097895 A1* | 5/2007 | Keshavarzian et al. ...... 370/311 |

* cited by examiner

*Primary Examiner*—Matthew D Anderson
*Assistant Examiner*—David Bilodeau
(74) *Attorney, Agent, or Firm*—NSIP Law

(57) ABSTRACT

A system and method for saving sensor power consumption based on context information on a wireless sensor network are provided. Basic context information is received from inside and outside of a network system including at least one sensor, wherein context information based on the basic context information is determined by inference, a group of expected services corresponding to the context information is determined, a sensor operation mode according to the group of expected services is determined, and control data is transmitted to the sensor according to the sensor operation mode. Accordingly, a sensor operation mode is adaptively determined according to changes of context information so that power consumption of a sensor can be saved.

16 Claims, 3 Drawing Sheets

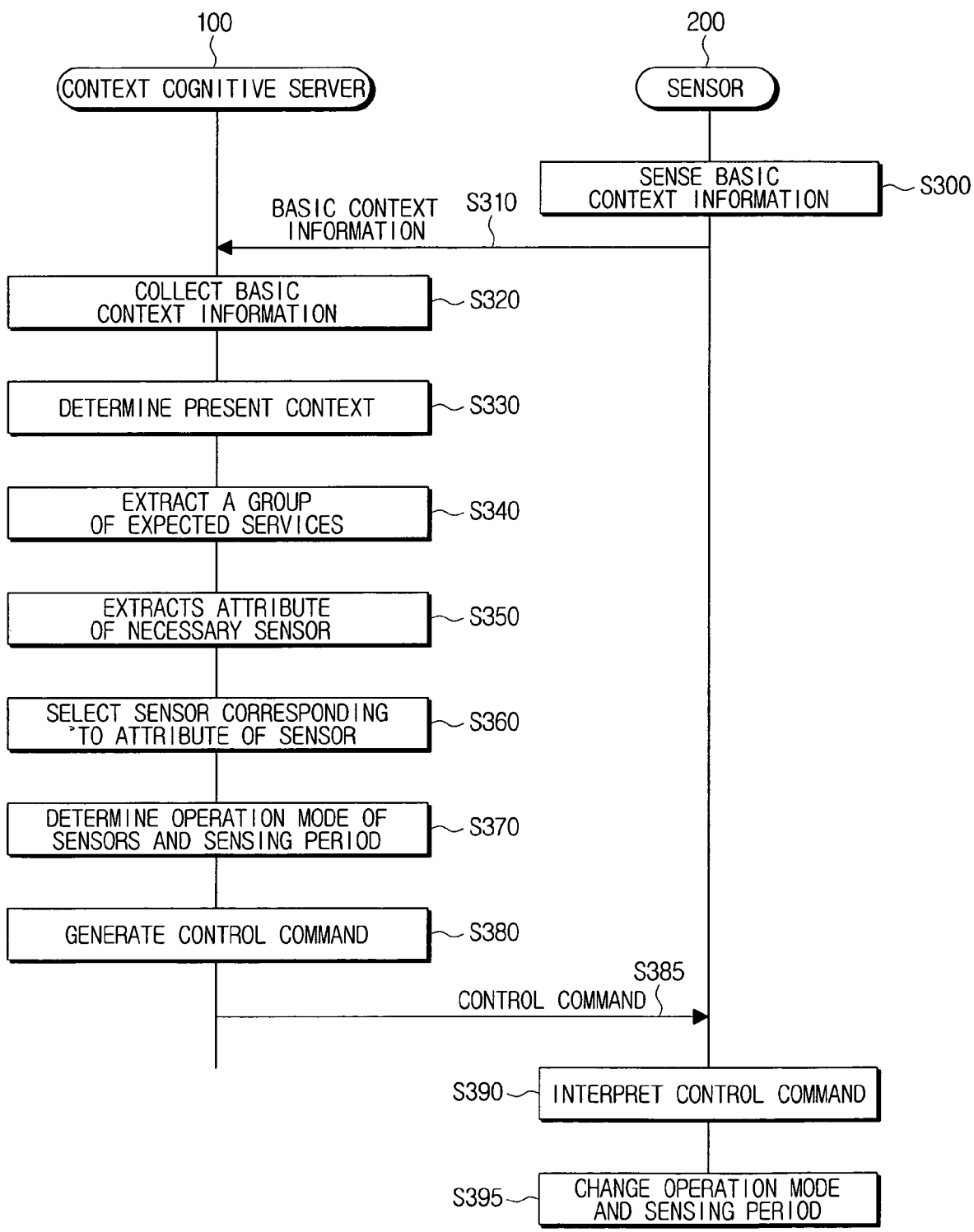

SYSTEM AND METHOD FOR SAVING POWER CONSUMPTION OF SENSOR BASED ON CONTEXT INFORMATION IN WIRELESS SENSOR NETWORK

PRIORITY

This application claims the benefit under 35 U.S.C. §119(a) of Korean Patent Application No. 2005-95467, filed Oct. 11, 2005, in the Korean Intellectual Property Office, the entire contents of which are hereby incorporated by reference.

BACKGROUND OF THE INVENTION

1. Field of the Invention

The present invention relates to a system and method for saving power consumption of a sensor on a wireless sensor network. More particularly, the present invention relates to a system and method for saving power consumption of a sensor based on context information on a wireless sensor network.

2. Description of the Related Art

A wireless sensor network can be defined as 'a number of sensors connected to a network in a wireless manner.' Wireless network technology is a technology in which a sensor node having computing and wireless communication ability is established to form a network to transmit/receive sensing information acquired through a wireless sensor network, and to employ the network to watch/control the network from a remote area. An object of a wireless sensor is to provide computing and wireless communication ability to every object in the network in order to implement a ubiquitous environment wherein objects can communicate with each other anytime and anywhere. A sensor node on a wireless sensor network transmits information sensed in a sensor to a base station functioning as a gateway, and the base station transmits the information through the network to a user requiring the information.

One of the requirements for constructing a wireless sensor network is low power consumption of sensor nodes. To implement ubiquitous computing, extension of the wireless network is needed. However, power must be supplied to each network node to extend the network within the conventional personal area network (PAN). Because it cannot be assumed that power is supplied from outside of the network in a low power wireless communications network such as the ubiquitous sensor network (USN), power consumption of a node is a key part to the life span of the network.

SUMMARY OF THE INVENTION

Aspects of the present invention address at least the above problems and disadvantages and provide at least the advantages described below. Accordingly, exemplary embodiments of the present invention provide a system and method of saving sensor power consumption on a wireless sensor network by adaptively determining a sensor operation mode according to change of context information.

In order to achieve the above-described aspects of exemplary embodiments of the present invention, a method of saving sensor power consumption based on context information is provided. The method comprises receiving basic context information from inside and/or outside of a network system comprising at least one sensor, determining context information by inference based on basic context information, determining a group of expected services corresponding to the context information, determining a sensor operation mode according to the group of expected services, and transmitting control data to the sensor according to the sensor operation mode.

According to an exemplary implementation, basic context information may be transmitted from the sensor and/or various devices inside and/or outside of the network system.

According to another exemplary implementation, the context information is inferred with reference to the basic context information sensed from location and movement of a user and/or a behavior pattern of the user.

According to another exemplary implementation, a group of the expected services comprises a service expected in a user location corresponding to the location information of the user and a location adjacent to the user location, and/or a service expected according to the behavior pattern of the user.

According to another exemplary implementation, determining sensor operation mode comprises extracting an attribute of the sensor necessary for the group of the expected services.

According to another exemplary implementation, determining sensor operation mode comprises sorting out sensors into a group of interest sensors having the extracted sensor attribute and a group of no-interest sensors not having the extracted sensor attribute.

According to another exemplary implementation, determining sensor operation mode comprises determining sensing period and/or sensing data transmission period of the group of interest sensors and the group of no-interest sensors.

According to another exemplary implementation, the sensor attribute comprises at least one of sensor location, sensing type, and an amount of power.

The foregoing and other aspects of exemplary embodiments of the present invention provide a system for saving power consumption of a sensor based on context information. The system comprises a basic context information collector for receiving basic context information from inside and/or outside a network system comprising at least one sensor, a context inference part for determining context information by inference based on the basic context information, a expected service extractor for determining a group of expected services corresponding to the context information, a sensor mode determiner for determining a sensor operation mode according to the group of expected services, and a data transceiver for transmitting control data to the sensor according to the sensor operation mode.

According to another exemplary implementation, the basic context information may be transmitted from the sensor and/or various devices inside and/or outside of the network system.

According to another exemplary implementation, the inferred context information is inferred with reference to the basic context information sensed from location and movement of a user and/or a behavior pattern of the user.

According to another exemplary implementation, the system further comprises a necessary sensor attribute extractor for extracting an attribute of the sensor necessary for the group of the expected services.

According to another exemplary implementation, the system further comprises a sensor sorter for sorting out sensors into a group of interest sensors having the extracted sensor attribute and a group of no-interest sensors not having the extracted sensor attribute.

According to another exemplary implementation, the sensor mode determiner determines sensing period and/or sensing data transmission period of the group of interest sensors and the group of no-interest sensors.

According to another exemplary implementation, the sensor attribute comprises at least one of sensor location, sensing type, and an amount of power.

The foregoing and other aspects of exemplary embodiments of the present invention provide, a wireless network system comprising a sensor for collecting and transmitting basic context information, a context cognitive server for receiving the basic context information from the sensor and various internal and external devices, context information determined by inference based on the basic context information, and a group of expected services determined from the inferred context information, wherein an attribute of the sensor necessary for the group of the expected services is extracted, sensors are sorted into a group of interest sensors having the extracted sensor attribute and a group of no-interest sensors not having the extracted sensor attribute, an operation mode of the group of interest sensors and the group of no-interest sensors is determined, and control data is transmitted to the group of interest sensors and the group of no-interest sensors according to the sensor operation mode.

BRIEF DESCRIPTION OF THE DRAWING FIGURES

The above and other aspects, exemplary features and advantages of the present invention will become more apparent from the following detailed description of certain exemplary embodiments when taken in conjunction with the accompanying drawings, in which:

FIG. 3 is a flow chart of a signal showing a method of saving sensor power consumption on a wireless sensor network according to an exemplary embodiment of the present invention.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
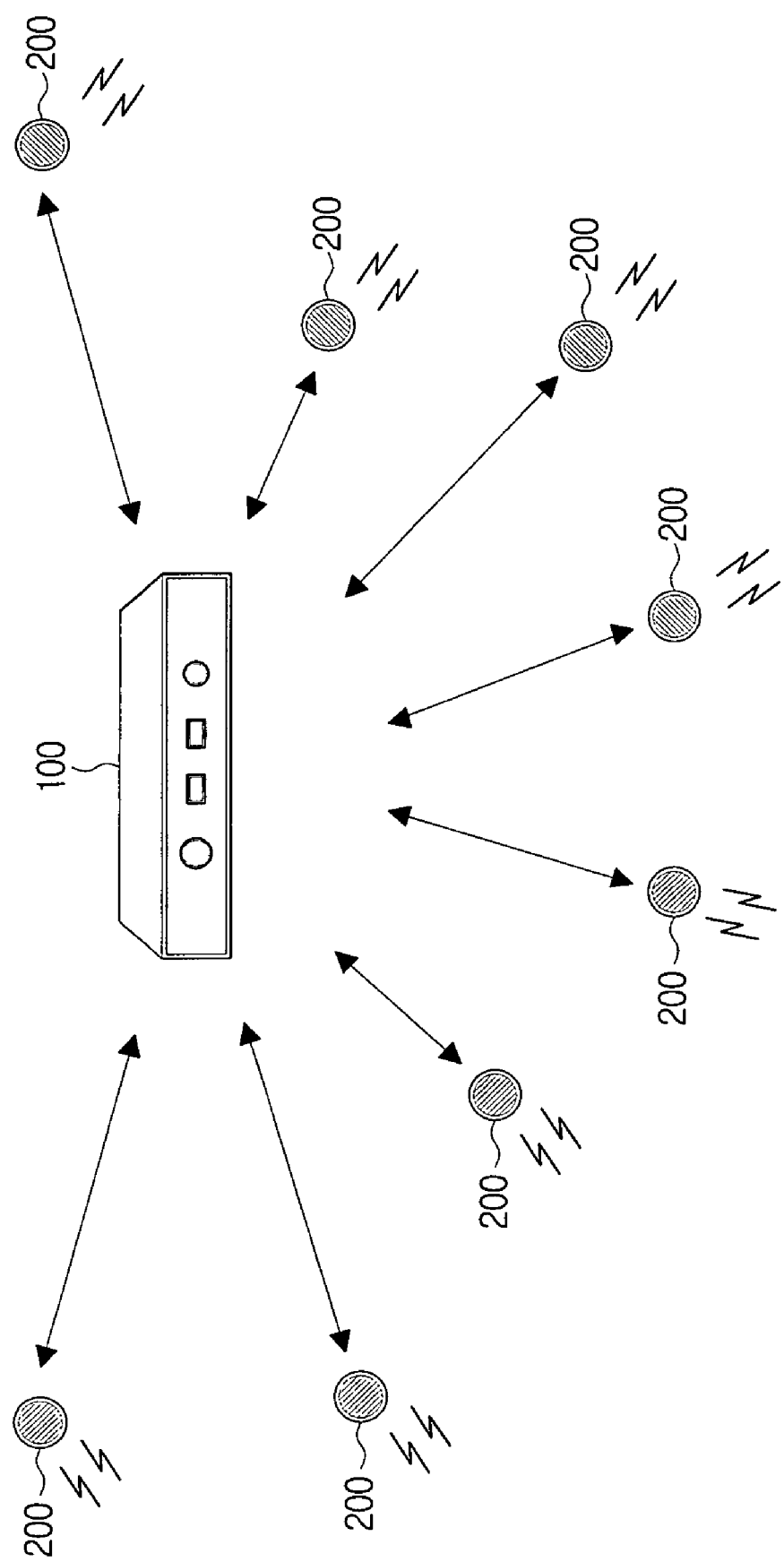
FIG. 1 is a schematic view showing the configuration of a wireless sensor network according to an exemplary embodiment of the present invention.

FIG. 1 is a schematic view showing the configuration of a wireless sensor network according to an exemplary embodiment of the present invention.

Referring to FIG. 1, a wireless sensor network according to an exemplary embodiment of the present invention comprises a context cognitive server 100 and one or more sensors 200. Each sensor on the wireless sensor network senses basic context information such as temperature, movement, pressure and light according to its function, and transmits the sensed basic context information to the context cognitive server 100 periodically or when the information datum exceeds a certain threshold. The above-described functions of the sensors according to an exemplary embodiment of the present invention can be performed by various devices such as television, audio, and computer on the wireless sensor network.

The context cognitive server 100 receives the basic context information from each sensor, infers a present context from the basic context information, expects services from the inferred context, and provides the expected services to a user. When providing services, a sensor operation mode (for example, sensing period or sensing data transmission period) necessary to the services from a group of expected services is determined according to the context information.

After the operation mode of each sensor is determined, the context cognitive server 100 transmits a control command to each sensor, and each sensor performs the operation mode determined by the context cognitive server 100 so that unnecessary power consumption can be prevented.

Figure 2:
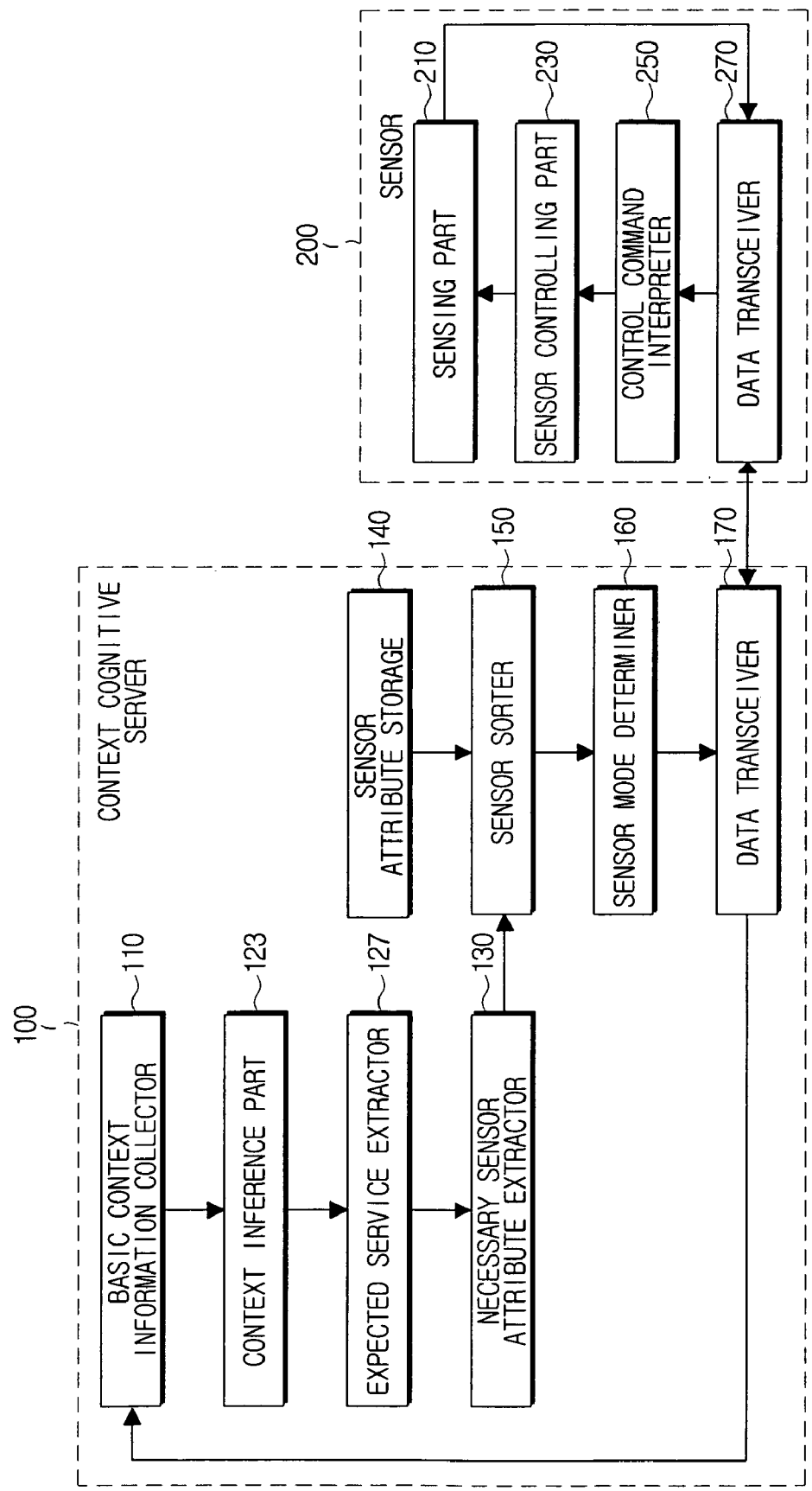
FIG. 2 is a schematic diagram showing the configuration of a context cognitive server and sensor according to an exemplary embodiment of the present invention.

FIG. 2 is a schematic diagram showing the configuration of the context cognitive server and a sensor according to an exemplary embodiment of the present invention.

Referring to FIG. 2, according to an exemplary embodiment of the present invention, the context cognitive server 100 comprises a basic context information collector 110, a context inference part 123, an expected service extractor 127, a necessary sensor attribute extractor 130, a sensor attribute storage 140, a sensor sorter 150, a sensor mode determiner 160 and a data transceiver 170.

The basic context information collector 110 collects context information transmitted from each sensor 200 to the data transceiver 170. The context inference part 123 infers the present context from the basic context information collected and forwards the inference to the expected service extractor 127. The expected service extractor 127 extracts services suitable for the present context inferred by the context inference part 123.

When the expected service extractor 127 extracts a group of expected services, the expected service extractor 127 may extract a group of services relevant to a user's present location and adjacent location based on information on the user's present location, or may extract a group of services based on the accumulated behavior pattern of the user for a certain period of time.

The necessary sensor attribute extractor 130 extracts attributes of a sensor necessary for the expected service extractor 127. Attributes of a sensor can comprise, for example, sensor location, sensor type, and an amount of power.

The sensor attribute storage 140 stores information on the attributes (for example, sensor type, location and power supply type) of all sensors constructing the wireless sensor network. The sensor sorter 150 selects sensors corresponding to the attributes of the sensors extracted in the necessary sensor attribute extractor 130 among the sensors constructing the wireless sensor network. When the sensor sorter 150 sorts sensors, information on sensor attribute stored in the sensor attribute storage 140 is used.

The sensor mode determiner 160 determines a sensor operation mode based on information sorted by the sensor sorter 150. In an exemplary implementation of the present invention, the sensor mode determiner 160 divides a group of sorted interest sensors and a group of no-interest sensors and can determine sensing period and sensing data transmission period (for example, 1 s, 10 s or 30 s). Accordingly, when the sensor mode determiner 160 determines a sensor operation mode, a mode minimizing sensor power consumption is selected.

The data transceiver 170 receives the context information transmitted from the sensors 200 on the wireless sensor network and transmits the information to the basic context information collector 110, and further transmits a control command to the sensors 200 according to the sensor operation mode of a group of interest sensors and a group of no-interest sensors, which is determined in the sensor mode determiner 160.

Sensor 200 according to an exemplary embodiment of the present invention includes comprises a sensing part 210, a sensor controlling part 230, a control command interpreter 250, and a data transceiver 270.

The sensing part 210 senses basic context information on the wireless sensor network by sensing the external environment and forwards the sensed basic context information to the data transceiver 270. The data transceiver 270 transmits the basic context information received from the sensing part 210 to the context cognitive server 100, transmits a control command of the operation mode (for example, sensing period and sensing data transmission period) determined by the context cognitive server 100 according to the context information, and transmits a control command to the control command interpreter 250. The control command interpreter 250 interprets the control command received from the context cognitive server 100 and transmits the interpreted data to the sensor controlling part 230.

The sensor controlling part 230 controls an operation of the sensing part 210 according to the operation mode determined by the context cognitive server 100 through the interpreted data received from the control command interpreter 250.

FIG. 3 is a flow chart of a signal showing a method of saving sensor power consumption on a wireless sensor network according to an exemplary embodiment of the present invention. Referring to FIG. 2 and FIG. 3, the sensor 200 senses context information in the wireless sensor network through the sensing part 210 (step S300) and the sensed context information is transmitted through the data transceiver 270 to the context cognitive server 100 (step S310). The data transceiver 170 of the context cognitive server 100 receives the basic context information from the sensor 200 and transmits the basic context information to the basic context information collector 110. The basic context information collector 110 collects the basic context information from each of the sensors 200 (step S320).

Next, the context inference part 123 determines the present context of the network based on the basic context information collected in the basic context information collector 110 from each sensor 200 and various internal and external devices (step S330). The expected service extractor 127 extracts a group of expected services suitable for the present context determined by the context inference part 123 (step S340). The necessary sensor attribute extractor 130 extracts the attribute of a sensor necessary for a group of expected services which are extracted in the expected service extractor 127 (step S350).

Subsequently, the sensor sorter 150 arranges the sensors into a group of interest sensors having attributes necessary for the group of the expected services and a group of no-interest sensors not having the attributes, using network sensor attribute information stored in the sensor attribute storage 140 (step S360). The sensor mode determiner 160 determines a sensor operation mode (step S370) of sensors on the wireless sensor network based on information on a group of interest sensors and a group of no-interest sensors which are sorted by the sensor sorter 150 (step S370) and generates a control command (step S380).

The generated control command is transmitted to the sensor 200 through the data transceiver 170 (step S385) and the data transceiver 270 of the sensor 200, which transmits the received control command to the control command interpreter 250. The control command interpreter 250 interprets the control command (step S390) and transmits the interpreted data to the sensor controlling part 230.

The sensor controlling part 230 receives the data from the control command interpreter 250 and controls a sensor operation mode so that the sensor operation mode of the sensor changes to the operation mode determined by the context cognitive server 100 (step S395).

A method of saving sensor power consumption based on context information on a wireless sensor network according to an exemplary embodiment of the present invention will be described below.

When a user leaves a location where the wireless sensor network is installed, the sensors 200 installed indoors sense the basic context information such as movement and location of the user, and transmits the information to the context cognitive server 100. Through the context inference part 123 and based on the collected basic context information, the context cognitive server 100 concludes that the user left the location.

The expected service extractor 127 extracts 'security service,' which is an expected service in the event a user leaves the sensor location, the necessary sensor attribute extractor 130 extracts attributes of sensors for the security service, and the sensor sorter 150 arranges the sensors having the corresponding attributes into a group of interest sensors and the remaining sensors into a group of no-interest sensors. The sensor mode determiner 160 determines an operation mode corresponding to a group of interest sensors and a group of no-interest, respectively.

For example, a door sensor on the gateway, one of a group of interest sensors, operates in a mode which comprises changing a sensing period of 5 seconds to a sensing period of 1 second. On the other hand, sensors located in an indoor room, for example, a living room, which are grouped as no-interest sensors, operate in a mode which comprises changing a sensing period of 0.5 seconds to a sensing period of 3 seconds.

The sensor mode determiner 160 generates a control command corresponding to the determined sensing period and transmits it to the sensor 200. The sensor 200 interprets the control command and operates in a mode corresponding to the control command.

An exemplary embodiment of the present invention directed to a method of saving power consumption of a sensor based on context information on a wireless sensor network will now be described.

A first badge (sensor) is attached to the clothes of a baby and a second badge (sensor) is attached to the clothes of a mother. The first badge periodically measures distance from the second badge and transmits the measured basic context information (distance information) to the context cognitive server 100. The context cognitive server 100 is aware from the basic context information that the mother and baby are not in the same room and infers that the mother could not take care of the baby immediately.

The expected service extractor 127 extracts a baby monitoring service as a service occurring in the present context. The necessary sensor attribute extractor 130 extracts the sensor attribute necessary for the corresponding service and the sensor sorter 150 sorts sound and movement sensors as a group of interest sensors and other sensors as a group of no-interest sensors.

The sensor mode determiner 160 determines an operation mode corresponding to the group of interest sensors and the group of no-interest, respectively. In other words, the sound sensor and movement sensor in the group of interest sensors are determined to operate in the mode which comprises changing from a sleep mode to a sensing period of 5 seconds. On the other hand, sensors in the group of no-interest sensors are determined to operate in the mode comprising changing to a sleep mode.

The sensor mode determiner 160 generates a control command corresponding to the determined operation mode and transmits it to the sensor 200. The sensor 200 interprets the control command and operates in a mode corresponding to the control command.

The data transceiver 170 may be located out of the context cognitive server 100, and in that case, the data transceiver 170 may operate as a base station.

As can be appreciated from the above description, a sensor operation mode comprising, for example, sensing period and sensing data transmission period, is adaptively determined according to changes of context information so that sensor consumption can be saved.

While the present invention has been particularly shown and described with reference to certain exemplary embodiments thereof, it will be understood by those of ordinary skill in the art that various changes in form and detail may be made therein without departing from the spirit and scope of the invention as defined by the appended claims and equivalents thereof.

What is claimed is:

1. A method of saving sensor power consumption based on context information, the method comprising:
   receiving basic context information from at least one of inside and outside of a network system comprising a plurality of sensors, the basic context information comprising at least one of temperature, movement, pressure, and light, based on a function of a sensor;
   determining context information by inference based on the basic context information;
   determining one or more expected services corresponding to the context information;
   extracting one or more attributes of a sensor necessary for the one or more expected services;
   sorting the plurality of sensors into one or more interest sensors and one or more non-interest sensors, based upon the one or more extracted sensor attributes;
   determining a first sensor operation mode having a first sensing period and a second sensor operation mode having a second sensing period, according to the one or more expected services, wherein the first sensing period is different in amount of time from the second sensing period; and
   transmitting control data to the interest sensors according to the first sensor operation mode and transmitting control data to the non-interest sensors according to the second sensor operation mode.

2. The method of claim 1, wherein the basic context information is transmitted from at least one of a sensor inside the network system, a sensor outside the network system, a device inside the network system, and a device outside the network system.

3. The method of claim 1, wherein the context information is inferred with reference to the basic context information sensed from sensor location and movement.

4. The method of claim 1, wherein the one or more expected services comprises a service expected in a sensor location corresponding to the location information of the sensor and a location adjacent to the sensor location.

5. The method of claim 1, wherein the determining of the first sensor operation mode and the second sensor operation mode comprises determining sensing period and sensing data transmission period of the group of interest sensors and the group of no-interest sensors.

6. The method of claim 1, wherein the sensor attribute comprises at least one of sensor location, sensing type, and amount of power.

7. A system for saving sensor power consumption based on context information, the system comprising:
   a basic context information collector for receiving basic context information from at least one of inside and outside of a network system comprising a plurality of sensors, the basic context information comprising at least one of temperature, movement, pressure, and light, based on a function of a sensor;
   a context inference part for determining context information by inference based on the basic context information;
   an expected service extractor for determining one or more expected services corresponding to the context information;
   a necessary sensor extractor for extracting one or more attributes of a sensor necessary for the one or more expected services
   a sensor node sorter for sorting the plurality of sensors into one or more interest sensors and one or more non-interest sensors, based upon the one or more extracted attributes;
   a sensor mode determiner for determining a first sensor operation mode having a first sensing period and a second sensor operation mode having a second sensing period, according to the one or more expected services, wherein the first sensing period is different in amount of time from the second sensing period; and
   a data transceiver for transmitting control data to the interest sensors according to the first sensor operation mode and transmitting control data to the non-interest sensors according to the second sensor operation mode.

8. The system of claim 7, wherein the basic context information is transmitted from at least one of a sensor inside the network system, a sensor outside the network system, a device inside the network system, and a device outside the network system.

9. The system of claim 7, wherein the context information is inferred with reference to the basic context information sensed from sensor location and movement.

10. The system of claim 7, wherein the sensor mode determiner determines at least one of a sensing period and a sensing data transmission period of the group of interest sensors and the group of no-interest sensors.

11. The system of claim 7, wherein the sensor attribute comprises at least one of sensor location, sensing type, and amount of power.

12. A wireless network system, comprising:
   a plurality of sensors for collecting and transmitting basic context information, the basic context information comprising at least one of temperature, movement, pressure, and light, based on a function of a sensor; and
   a context cognitive server for receiving the basic context information from the sensor,
   wherein the context cognitive server:
   determines context information by inference based on the basic context information;
   determines one or more expected services from the context information;

extracts one or more sensor attributes necessary for the one or more expected services;

sorts sensors into a group of one or more interest sensors having the extracted sensor attribute and a group of one or more no-interest sensors not having the extracted sensor attribute;

determines a first sensor operation mode having a first sensing period for the group of interest sensors and a second sensor operation mode having a second sensing period for the group of no-interest sensors, wherein the first sensing period is greater in amount of time than the second sensing period; and transmits control data to the group of interest sensors according to the first sensor operation mode and transmits control data to the non-interest sensors according to the second sensor operation mode.

13. The method of claim 1, wherein the inferred context information is inferred with reference to the basic context information sensed from the behavior pattern of a user.

14. The system of claim 7, wherein the context information is inferred with reference to the basic context information sensed from a behavior pattern of a user.

15. The method of claim 1, wherein the second sensing period is greater in amount of time than the first sensing period.

16. The system of claim 7, wherein the second sensing period is greater in amount of time than the first sensing period.

* * * * *